(12) United States Patent
Mese et al.

(10) Patent No.: US 7,558,089 B2
(45) Date of Patent: Jul. 7, 2009

(54) METHOD AND APPARATUS FOR SPACE VECTOR MODULATION IN MULTI-LEVEL INVERTERS

(75) Inventors: Erkan Mese, Rochester Hills, MI (US); David Allan Torrey, Ballston Spa, NY (US)

(73) Assignee: Advanced Energy Conversion, LLC, Schenectady, NY (US)

( * ) Notice: Subject to any disclaimer, the term of this patent is extended or adjusted under 35 U.S.C. 154(b) by 309 days.

(21) Appl. No.: 11/638,052

(22) Filed: Dec. 13, 2006

(65) Prior Publication Data

US 2007/0139970 A1    Jun. 21, 2007

Related U.S. Application Data

(60) Provisional application No. 60/749,818, filed on Dec. 13, 2005.

(51) Int. Cl.
*H02M 7/00* (2006.01)

(52) U.S. Cl. .......................................................... 363/52
(58) Field of Classification Search ................. 363/13, 363/37, 41, 43, 67, 71, 98, 52
See application file for complete search history.

(56) References Cited

U.S. PATENT DOCUMENTS

| | | | | |
|---|---|---|---|---|
| 4,953,069 A | * | 8/1990 | Braun et al. | ................... 363/41 |
| 5,355,297 A | * | 10/1994 | Kawabata et al. | ............. 363/43 |
| 5,552,977 A | * | 9/1996 | Xu et al. | ....................... 363/41 |
| 5,684,688 A | | 11/1997 | Rouaud et al. | |
| 5,790,396 A | | 8/1998 | Miyazaki et al. | |
| 6,151,257 A | | 11/2000 | Jeffrey et al. | |
| 6,337,804 B1 | | 1/2002 | Kea et al. | |
| 6,653,812 B1 | * | 11/2003 | Huo et al. | .................. 318/801 |
| 6,911,801 B2 | * | 6/2005 | Youm | ......................... 318/801 |
| 2008/0258673 A1 | * | 10/2008 | Welchko et al. | ............. 318/811 |

OTHER PUBLICATIONS

A Novel General SVM Algorithm for Multilevel inverter Based on Imaginary Coordination; Xuan Hou et al. ; Nov. 2003.*
A General SVM Algorithm for Multilevel Converter Considering Zero-Sequence Component Control; Yongdong Li et al. Mar. 5, 2005.*
J. Rodriquez et al, "Multi-level inverters: a survey of topologies, controls and applications," IEEE Trans. Ind. Electron., vol. 49, pp. 724-738, Aug./Sep. 2.
J.S. Lai et al, "Multi-level converters- A new breed of power converters," IEEE Trans. Ind. Appl., vol. 32, pp. 509-517, May/Jun. 1996.
L. Tolbert et al, "Multi-level converters for large electric drives," IEEE Trans. Ind. Appl., vol. 35, pp. 36-44, Jan./Feb. 1999.

(Continued)

*Primary Examiner*—Tung S Lau
*Assistant Examiner*—Yemane Mehari

(57) ABSTRACT

An apparatus for space vector modulation of a multi-level inverter, the apparatus comprising: a triangle generator for finding a modulation triangle enclosing a reference voltage vector, the modulation triangle comprising vertex vectors; a duty ratio calculator for determining duty ratios for the vertex vectors; a switching function selector for selecting switching functions corresponding to the vertex vectors; a forbidden transition identifier for identifying a forbidden transition between two of the vertex vectors; and a control module for applying the switching functions to the multi-level inverter according to the duty ratios and avoiding the forbidden transition.

8 Claims, 3 Drawing Sheets

OTHER PUBLICATIONS

N. Celanovic et al, "A fast space-vector modulation algorithm for multi-level three-phase converters," IEEE Trans. Ind. Appl., vol. 37, pp. 637-641, Mar./Apr. 2001.

H. Zhang et al, "Multi-level inverter modulation schemes to eliminate common-mode voltages," IEEE Trans. Ind. Appl., vol. 36, pp. 1645-1653, Nov./Dec. 2000.

N. Celanovic et al, "A comprehensive study of neutral-point voltage balancing problem in three level neutral-point-clamped voltage source PWM inverters," IEEE Trans. Power Electronics, vol. 15, pp. 242-249, Mar. 2000.

B.P. McGrath et al, "Optimized space vector sequences for multi-level inverters," IEEE Trans. Power Electronics, vol. 18, pp. 1293-1301, Nov. 2003.

J. Holtz, "Pulsewidth modulation for electronic power conversion," Proc. IEEE, vol. 82, pp. 1194-1214, Aug. 1994.

* cited by examiner

METHOD AND APPARATUS FOR SPACE VECTOR MODULATION IN MULTI-LEVEL INVERTERS

CROSS REFERENCE TO RELATED APPLICATIONS

This application claims the benefit of U.S. provisional application 60/749,818, filed Dec. 13, 2005.

BACKGROUND

The present invention relates generally to the field of power conversion electronics and more specifically to the field of space vector modulation for multi-level inverters.

A multi-level inverter is an assemblage of electronically controllable switches coupling a multi-level direct current (DC) input bus to an alternating current (AC) output bus. Often, the AC output bus will comprise multiple output phases.

Nominally, the controllable switches are operated either fully open or fully closed. Under such operation, the only instantaneous output voltages the inverter can produce are those levels available at the DC input bus. Rapid switching between different instantaneous output voltages is often used, therefore, to produce an output whose time average is intermediate to the DC input bus levels. When multiple output phases are produced, each switch closure combination produces a pattern of output voltages across the phases which may be thought of as being distributed in space. Hence, the patterns of output voltages are termed "space vectors," and the rapid switching scheme is known as "space vector modulation" or "space vector pulse width modulation."

Compared to two-level inverters, multi-level inverters promise many advantages including reduced voltage and current harmonics at relatively lower switching frequencies and reduced voltage rating requirements for the controllable switches. However, the increased number of DC input bus levels implies an increased number of controllable switches. The mapping (switching function) from desired (reference) space vectors to switch closure combinations is typically not unique. Furthermore, with a larger number of controllable switches, injudicious modulation strategies may result in unacceptably high switching losses.

Opportunities exist, therefore, to find new space vector modulation techniques to resolve the ambiguity inherent in the non-uniqueness of the switching function and to efficiently utilize the controllable switches to reduce switching losses.

SUMMARY

The opportunities described above are addressed, in one embodiment of the present invention, by an apparatus for space vector modulation of a multi-level inverter, the apparatus comprising: a triangle generator for finding a modulation triangle enclosing a reference voltage vector, the modulation triangle comprising vertex vectors; a duty ratio calculator for determining duty ratios for the vertex vectors; a switching function selector for selecting switching functions corresponding to the vertex vectors; a forbidden transition identifier for identifying a forbidden transition between two of the vertex vectors; and a control module for applying the switching functions to the multi-level inverter according to the duty ratios and avoiding the forbidden transition.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
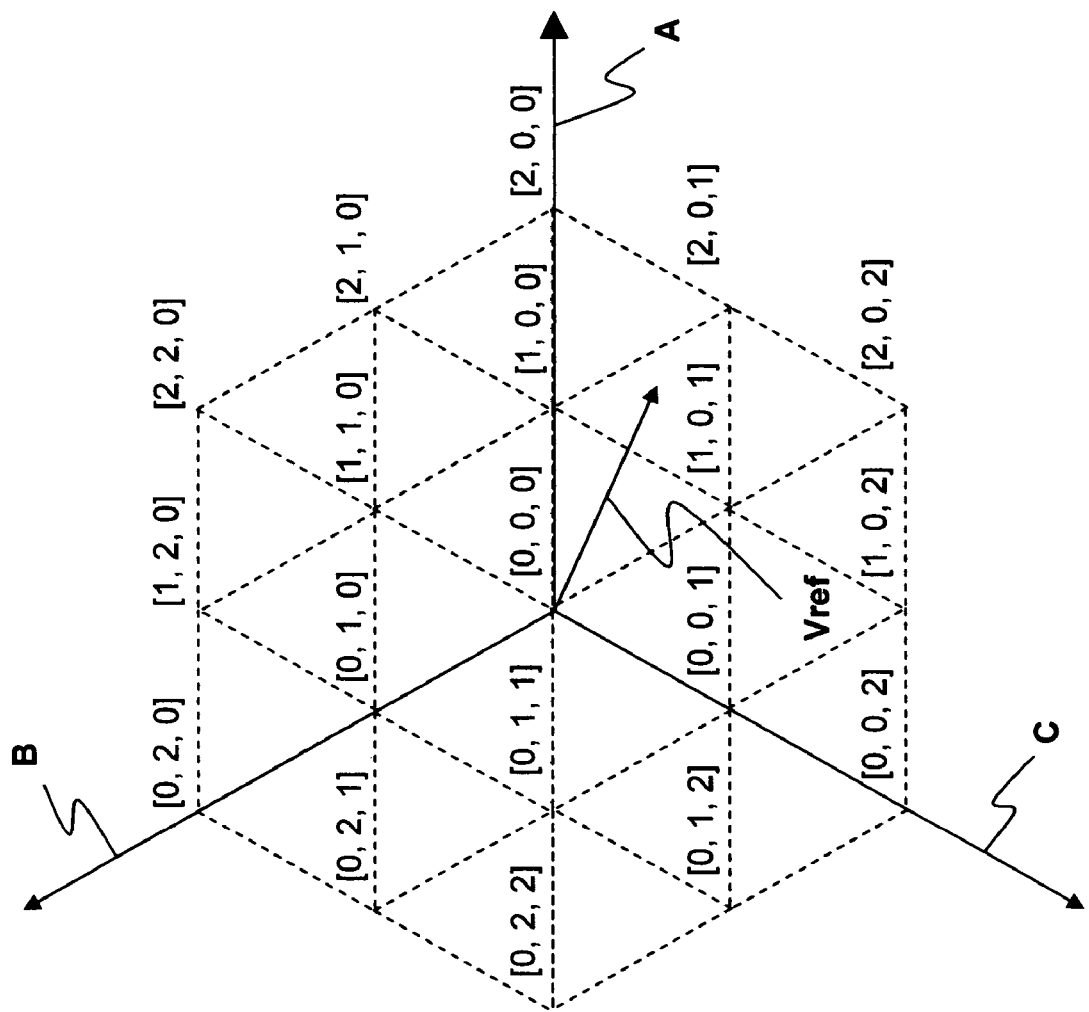
FIG. 1 illustrates a switching function for a three-level, three-phase inverter.

By way of example, not limitation, FIG. 1 illustrates a switching function for a three-phase, three-level inverter, with the levels equally spaced. The A, B, and C axes correspond to the three AC output phases. The space vector Vref can be thought of as a phasor rotating counterclockwise with constant angular speed. The projections of Vref onto A, B, and C represent sinusoidally varying voltages with amplitudes equal to the length of Vref, frequencies equal to the angular speed of Vref, and phases such that B lags A by 120 degrees and C lags B by 120 degrees. The numbers in brackets denote the three inverter phase output voltages divided by the DC input level spacing. For example, if the spacing between DC input levels is 10V, then triplet labels the point slightly below and to the left of the left bracket at a vertex of the dashed-line triangles. It will be obvious to one of ordinary skill in the art that the diagram of FIG. 1 can be expanded radially to include additional DC bus input levels.

To illustrate the inherent switching function non-uniqueness, note that, for example, the point is also equivalent to [1, 2, 2]. That is, taking one step along the B direction followed by one step along the C direction takes you to the same point as taking one step along A, two steps along B, and then two steps along C. Similarly, the origin is equivalent to [0, 0, 0], [1, 1, 1], and [2, 2, 2].

To illustrate the difference in efficiency among switching policies, note that synthesizing the time average value of Vref shown entails modulating among $V_1=[1,0,0]$, $V_2=[1,0,1]$, and $V_3=[2,0,1]$. If we choose the pattern $V_1,V_2,V_3,V_1,V_2,V_3$, then each repetition of the pattern requires six changes of switch state. If, in contrast, we choose the pattern $V_1,V_2,V_3,V_3,V_2,V_1$, then each repetition of the pattern requires only four changes of switch state and produces the same voltage with reduced switching loss.

Figure 2:
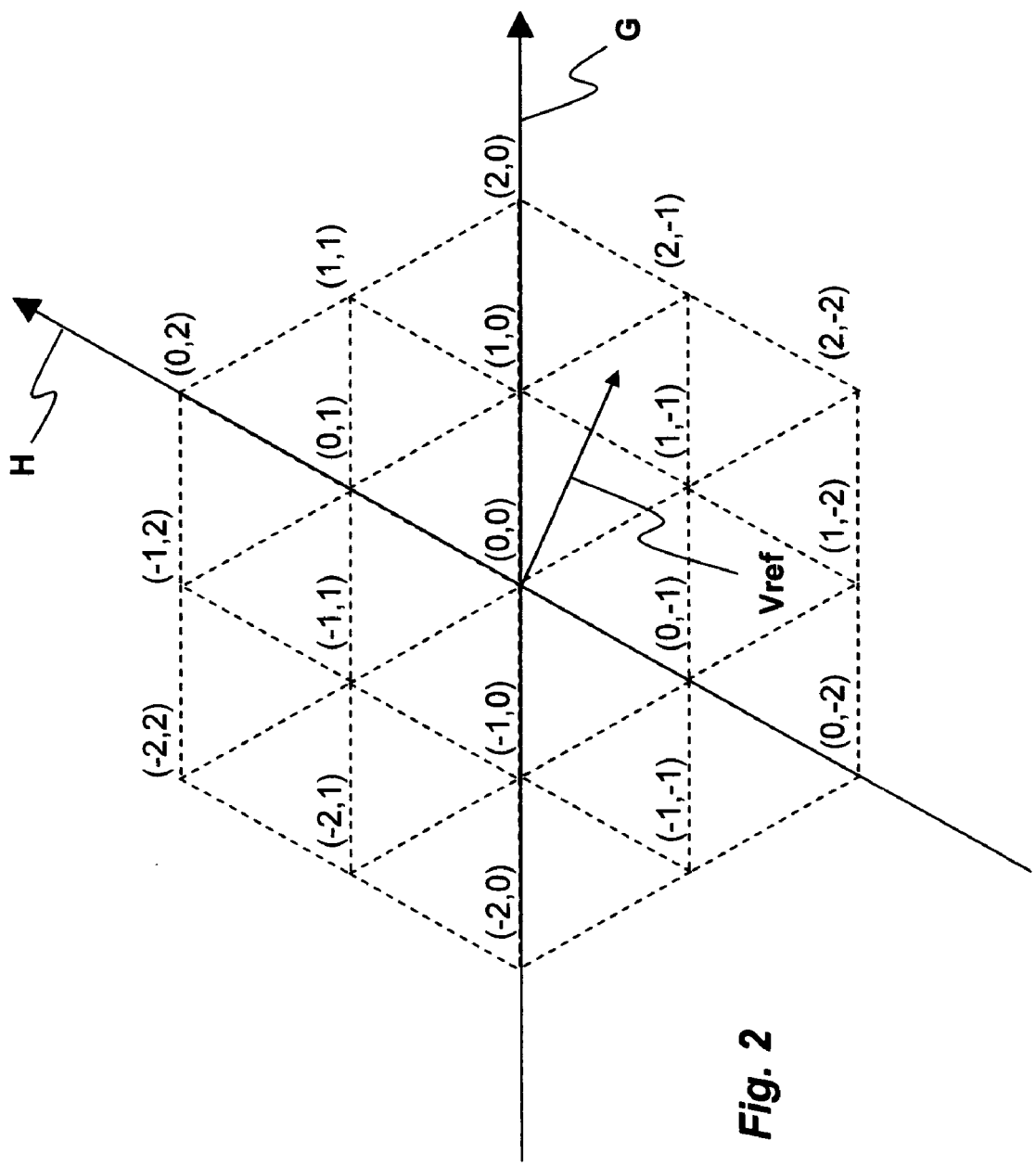
FIG. 2 illustrates a skew coordinate representation for space vectors of a three-level, three-phase inverter.

Continuing the example of FIG. 1, FIG. 2 illustrates a skew coordinate representation for space vectors of the same three-level, three-phase inverter. It is well known to those skilled in the art that a two-axis representation using G and H axes, as shown, where G coincides with the A axis and H coincides with the negative C axis, significantly simplifies some of the intermediate space vector modulation calculations. Each parenthetical, ordered (G, H) pair labels the point slightly below and to the left of the left parenthesis at a vertex of the dashed-line triangles. The representation is referred to as a "skew coordinate representation" because G and H are not orthogonal.

Figure 3:
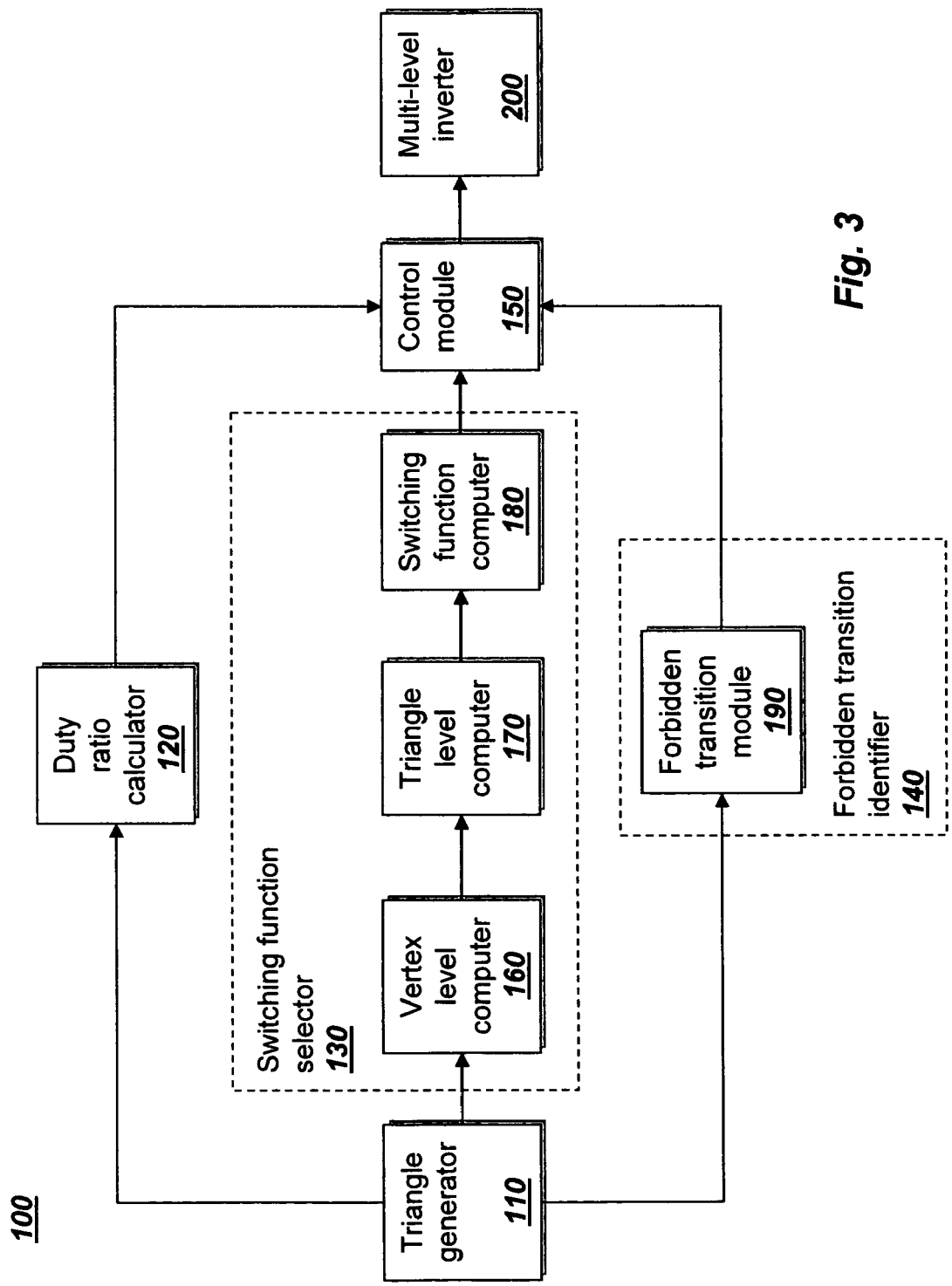
FIG. 3 illustrates a block diagram of one embodiment of the present invention.

In one embodiment of the present invention, FIG. 3 illustrates a block diagram of an apparatus 100 for space vector modulation of a multi-level inverter. Apparatus 100 comprises a triangle generator 110, a duty ratio calculator 120, a switching function selector 130, a forbidden transition identifier 140, and a control module 150. In operation, triangle generator 110 finds a modulation triangle enclosing a given reference voltage vector. For the three vertex vectors that delineate the modulation triangle, duty ratio calculator 120 determines the duty ratios required to reproduce the reference voltage vector. Switching function selector 130 then resolves any switching function ambiguity by selecting a switching function (i.e., a pattern of switch closures) corresponding to the vertex vectors. As the example of FIG. 1 illustrated, switching losses can be reduced if certain vector transitions are forbidden; hence, forbidden transition identifier 140 identifies a forbidden transition between two of the vertex vectors. Finally, control module 150 applies the selected switching functions to the multi-level inverter, according to the duty ratios found, and in an order that avoids the forbidden transition.

In a more detailed embodiment of the present invention, FIG. 3 also illustrates apparatus 100 wherein the switching function selector 130 comprises a vertex level computer 160, a triangle level computer 170, and a switching function computer 180. In operation, vertex level computer 160 compute a vertex level, L, for each of the vertex vectors. If a vertex vector is described by the skew coordinate pair (G, H), then L, is computed according to the rule $$L = \begin{cases} \text{abs}(H), \text{ if } G = 0 \text{ or } G + H = 0 \\ \text{abs}(G), \text{ if } H = 0 \\ H\sin(2\pi/3)/\sin(T), \text{ otherwise} \end{cases}$$

where $$T = \tan^{-1}\left(\frac{H\sin(2\pi/3)}{G + H\cos(\pi/3)}\right)$$

and "abs ( )" denotes the absolute value function.

Triangle level computer 170 then computes a triangle level, K, equal to the maximum of the individual vertex levels. Taking K as input, switching function computer 180 computes the switching functions, V, to the rule $$V = \begin{cases} [K, \text{abs}(K - \text{abs}(G)), \text{abs}(K - \text{abs}(G) - \text{abs}(H))], \\ \quad \text{if } G > 0 \text{ and } (G + H) > 0 \\ [\text{abs}(K - \text{abs}(G)), K, \text{abs}(K - \text{abs}(H))], \text{ if } G < 0 \text{ and } H > 0 \\ [\text{abs}(K - \text{abs}(G) - \text{abs}(H)), \text{abs}(K - \text{abs}(H)), K], \\ \quad \text{if } H < 0 \text{ and } (G + H) < 0 \end{cases}$$

In another more detailed embodiment, also illustrated in FIG. 3, forbidden transition identifier 140 comprises a forbidden transition module 190. In operation, forbidden transition module 190 identifies a forbidden transition between two of the vertex vectors. If a first vertex vector has skew coordinates ($G_1$, $H_1$), and a second vertex vector has skew coordinates ($G_2$, $H_2$), then the transition between the two vectors is forbidden if ($G_1$>0 and $G_1$+$H_1$>0 and $G_2$>0 and $G_2$+$H_2$>0 and $H_1$-$H_2$=0)

or ($G_1$<0 and $H_1$>0 and $G_2$<0 and $H_2$>0 and $G_1$-$G_2$+$H_1$-$H_2$=0)

or ($H_1$<0 and $G_1$+$H_1$<0 and $H_2$<0 and $G_2$+$H_2$<0 and $G_1$-$G_2$=0)

In another more detailed embodiment, also illustrated in FIG. 3, control module 150 is configured to avoid the forbidden transition as follows: if the switching functions are denoted respectively as $V_1$,$V_2$,$V_3$, with the identified forbidden transition being between $V_1$ and $V_3$, then repeating the switching functions in the order $V_1$, $V_2$, $V_3$, $V_3$, $V_2$, $V_1$, avoids the forbidden transition.

All of the elements described above of embodiments of the present invention may be implemented, by way of example, but not limitation, using singly or in combination any electric or electronic devices capable of performing the indicated functions. Examples of such devices include, without limitation: analog devices; analog computation modules; digital devices including, without limitation, small-, medium-, and large-scale integrated circuits, application specific integrated circuits (ASICs), and programmable logic arrays (PLAs); and digital computation modules including, without limitation, microcomputers, microprocessors, microcontrollers, digital signal processors (DSPs), and programmable logic controllers (PLCs).

In some embodiments, the elements described above of the present invention are implemented as software components in a general purpose computer. Such software implementations produce a technical effect of modulating the space vector of a multi-level inverter.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for space vector modulation of a multi-level inverter, said apparatus comprising:

a triangle generator for finding a modulation triangle enclosing a reference voltage vector, said modulation triangle comprising vertex vectors;

a duty ratio calculator for determining duty ratios for said vertex vectors;

a forbidden transition identifier for identifying a forbidden transition between two of said vertex vectors;

a control module for applying said switching functions to said multi-level inverter according to said duty ratios and avoiding said forbidden transition; and a switching function selector for selecting switching functions corresponding to said vertex vectors, wherein said switching function selector comprises:

a vertex level computer for computing vertex levels corresponding to said vertex vectors, each of said vertex vectors being described by a respective skew coordinate pair, (G, H), each of said vertex levels, L, being computed according to the rule:

$$L = \begin{cases} \text{abs}(H), \text{ if } G = 0 \text{ or } G + H = 0 \\ \text{abs}(G), \text{ if } H = 0 \\ H\sin(2\pi/3)/\sin(T), \text{ otherwise} \end{cases}$$

where $$T = \tan^{-1}\left(\frac{H\sin(2\pi/3)}{G + H\cos(\pi/3)}\right)$$

and "abs( )" denotes the absolute value function:

a triangle level computer for computing a triangle level, K, equal to the maximum of said vertex levels;

a switching function computer for computing said switching functions, each of said switching functions, V, being computed according to the rule:

$$V = \begin{cases} [K, \text{abs}(K-\text{abs}(G)), \text{abs}(K-\text{abs}(G)-\text{abs}(H))], \\ \quad \text{if } G>0 \text{ and } (G+H)>0 \\ [\text{abs}(K-\text{abs}(G)), K, \text{abs}(K-\text{abs}(H))], \text{ if } G<0 \text{ and } H>0 \\ [\text{abs}(K-\text{abs}(G)-\text{abs}(H)), \text{abs}(K-\text{abs}(H)), K], \\ \quad \text{if } H<0 \text{ and } (G+H)<0 \end{cases}$$

2. The apparatus of claim 1 wherein said forbidden transition identifier comprises:
   a forbidden transition module for identifying as forbidden a transition between a first vertex vector, having skew coordinates $(G_1,H_1)$, and a second vertex vector, having skew coordinates $(G_2,H_2)$ if ($G_1>0$ and $G_1+H_1>0$ and $G_2>0$ and $G_2+H_2>0$ and $H_1-H_2=0$)

or ($G_1<0$ and $H_1>0$ and $G_2<0$ and $H_2>0$ and $G_1-G_2+H_1-H_2=0$)

or ($H_1<0$ and $G_1+H_1<0$ and $H_2<0$ and $G_2+H_2<0$ and $G_1-G_2=0$).

3. The apparatus of claim 1 wherein said control module is configured for performing the acts of:
   denoting said switching functions respectively as $V_1$, $V_2$, $V_3$, said forbidden transition being between $V_1$ and $V_3$; and
   repeating said switching functions in the order $V_1$, $V_2$, $V_3$, $V_3$, $V_2$, $V_1$.

4. An apparatus for space vector modulation of a multi-level inverter system, said apparatus comprising:
   a triangle generator for finding a modulation triangle enclosing a reference voltage vector, said modulation triangle comprising vertex vectors;
   a duty ratio calculator for determining duty ratios for said vertex vectors;
   a switching function selector for selecting switching functions corresponding to said vertex vectors;
   a forbidden transition identifier for identifying a forbidden transition between two of said vertex vectors; and
   a control module for applying said switching functions to said multi-level inverter according to said duty ratios and avoiding said forbidden transition,
   said switching function selector comprising:
   a vertex level computer for computing vertex levels corresponding to said vertex vectors, each of said vertex vectors being described by a respective skew coordinate pair, (G, H), each of said vertex levels, L, being computed according to the rule:

$$L = \begin{cases} \text{abs}(H), \text{ if } G=0 \text{ or } G+H=0 \\ \text{abs}(G), \text{ if } H=0 \\ H\sin(2\pi/3)/\sin(T), \text{ otherwise} \end{cases}$$

where $$T = \tan^{-1}\left(\frac{H\sin(2\pi/3)}{G+H\cos(\pi/3)}\right)$$

and "abs( )" denotes the absolute value function;
   a triangle level computer for computing a triangle level, K, equal to the maximum of said vertex levels;
   a switching function computer for computing said switching functions, each of said switching functions, V, being computed according to the rule:

$$V = \begin{cases} [K, \text{abs}(K-\text{abs}(G)), \text{abs}(K-\text{abs}(G)-\text{abs}(H))], \\ \quad \text{if } G>0 \text{ and } (G+H)>0 \\ [\text{abs}(K-\text{abs}(G)), K, \text{abs}(K-\text{abs}(H))], \text{ if } G<0 \text{ and } H>0 \\ [\text{abs}(K-\text{abs}(G)-\text{abs}(H)), \text{abs}(K-\text{abs}(H)), K], \\ \quad \text{if } H<0 \text{ and } (G+H)<0 \end{cases}$$

said forbidden transition identifier comprising:
   a forbidden transition module for identifying as forbidden a transition between a first vertex vector, having skew coordinates $(G_1,H_1)$, and a second vertex vector, having skew coordinates $(G_2,H_2)$ if ($G_1>0$ and $G_1+H_1>0$ and $G_2>0$ and $G_2+H_2>0$ and $H_1-H_2=0$)

or ($G_1<0$ and $H_1>0$ and $G_2<0$ and $H_2>0$ and $G_1-G_2+H_1-H_2=0$)

or ($H_1<0$ and $G_1+H_1<0$ and $H_2<0$ and $G_2+H_2<0$ and $G_1-G_2=0$).

5. The apparatus of claim 4 wherein said control module is configured for performing the acts of:
   denoting said switching functions respectively as $V_1$, $V_2$, $V_3$, said forbidden transition being between $V_1$ and $V_3$; and
   repeating said switching functions in the order $V_1$, $V_2$, $V_3$, $V_3$, $V_2$, $V_1$.

6. A method of space vector modulation for a multi-level inverter system, said method comprising the acts of:
   finding a modulation triangle enclosing a reference voltage vector, said modulation triangle comprising vertex vectors;
   determining duty ratios for said vertex vectors;
   selecting switching functions corresponding to said vertex vectors;
   identifying a forbidden transition between two of said vertex vectors;
   applying said switching functions to said multi-level inverter according to said duty ratios and avoiding said forbidden transition; and
   selecting switching functions corresponding to said vertex vectors, such act comprising:
   computing vertex levels corresponding to said vertex vectors, each of said vertex vectors being described by a respective skew coordinate pair, (G, H), each of said vertex levels, L, being computed according to the rule:

$$L = \begin{cases} \text{abs}(H), \text{ if } G=0 \text{ or } G+H=0 \\ \text{abs}(G), \text{ if } H=0 \\ H\sin(2\pi/3)/\sin(T), \text{ otherwise} \end{cases}$$

where $$T = \tan^{-1}\left(\frac{H\sin(2\pi/3)}{G+H\cos(\pi/3)}\right)$$

and "abs( )" denotes the absolute value function;

computing a triangle level, K, equal to the maximum of said vertex levels;

computing said switching functions, each of said switching functions, V, being computed according to the rule:

$$V = \begin{cases} [K, \text{abs}(K-\text{abs}(G)), \text{abs}(K-\text{abs}(G)-\text{abs}(H))], \\ \quad \text{if } G > 0 \text{ and } (G+H) > 0 \\ [\text{abs}(K-\text{abs}(G)), K, \text{abs}(K-\text{abs}(H))], \text{ if } G < 0 \text{ and } H > 0 \\ [\text{abs}(K-\text{abs}(G)-\text{abs}(H)), \text{abs}(K-\text{abs}(H)), K], \\ \quad \text{if } H < 0 \text{ and } (G+H) < 0 \end{cases}.$$

7. The method of claim 6 wherein said act of identifying a forbidden transition between two of said vertex vectors comprises:

identifying as forbidden a transition between a first vertex vector, having skew coordinates $(G_1, H_1)$, and a second vertex vector, having skew coordinates $(G_2, H_2)$ if ($G_1 > 0$ and $G_1 + H_1 > 0$ and $G_2 > 0$ and $G_2 + H_2 > 0$ and $H_1 - H_2 = 0$)

or ($G_1 < 0$ and $H_1 > 0$ and $G_2 < 0$ and $H_2 > 0$ and $G_1 - G_2 + H_1 - H_2 = 0$)

or ($H_1 < 0$ and $G_1 + H_1 < 0$ and $H_2 < 0$ and $G_2 + H_2 < 0$ and $G_1 - G_2 = 0$).

8. The method of claim 6 wherein said act of applying said switching functions to said multi-level inverter comprises:

denoting said switching functions respectively as $V_1, V_2, V_3$, said forbidden transition being between $V_1$ and $V_3$; and repeating said switching functions in the order $V_1, V_2, V_3, V_3, V_2, V_1$.

* * * * *